United States Patent

[11] 3,596,462

| [72] | Inventor | Royce Hayes<br>2236-A Old Stone Mountain Road,<br>Chamblee, Ga. 30341 |
|---|---|---|
| [21] | Appl. No. | 795,595 |
| [22] | Filed | Jan. 31, 1969 |
| [45] | Patented | Aug. 3, 1971 |

[54] ELECTRONIC CLOCK
5 Claims, 8 Drawing Figs.

[52] U.S. Cl. ............................................................. 58/50,
58/127
[51] Int. Cl. ............................................................. G04b 19/00
[50] Field of Search ............................................ 58/23, 50,
127

[56] References Cited
UNITED STATES PATENTS

| 3,194,003 | 7/1965 | Polin | 58/50 |
| 3,333,410 | 8/1967 | Barbella | 58/23 |
| 3,485,033 | 12/1969 | Langley | 58/50 |

*Primary Examiner*—Richard B. Wilkinson
*Assistant Examiner*—Edith C. Simmons
*Attorney*—Jones & Thomas ABSTRACT: An electronic clock in which the time is indicated by a combination of hour indications and decimal minute indications. A basic time input is successively divided by factors to provide signals that control lights, the lights including a first series of lights to indicate the hour, a second series of lights to indicate the tens digit of the minute, and a third series of lights to indicate the units digit of the minute.

INVENTOR.
Royce Hayes
BY Jones & Thomas
ATTORNEYS 3,596,462

ELECTRONIC CLOCK

BACKGROUND OF THE INVENTION

1. Field of the Invention

This invention relates to electronic clocks, and is more particularly concerned with an electronic clock that uses a decimal indication of the time.

2. Description of the Prior Art

In the past, electronic clocks have usually taken the form of a substantially conventional clock face having 12-hour designations and 60-minute designations, the appropriate hour and minute designations being lighted to indicate the correct time. Alternatively, electronic clocks have taken the form of four counters to indicate the four digits that are required for the hour and minutes of the day, each of the counters being electronically controlled through a counting circuit in order to indicate the time of day.

The digital form of electronic clock has the disadvantage of requiring mechanical counters or the like in addition to a rather large amount of electronic circuitry in order to control the counters. Since one of the primary advantages of the electronic clock over the spring or electric motor driven clock is the lack of moving mechanical parts, the digital electronic clock both fails to realize the full advantage of the electronic clock and adds a large amount of electronic circuitry that becomes expensive. The electronic clock that uses a series of lights that are arranged in the fashion of the usual clock face are generally extremely complex since there is a very large number of lights, each of the lights being controlled to be turned on and off at precise times.

Another disadvantage of prior art electronic clocks is that, when the time indicated is incorrect, there is generally some means by which the normal progress of the electronic indication is simply accelerated, and one must hold a button or the like to maintain the accelerated rate of speed until the correct time is indicated by the clock.

SUMMARY OF THE INVENTION

The apparatus of the present invention overcomes the above mentioned and other difficulties encountered in the prior art by providing an electronic clock in which the time is indicated by combination of hour indications and decimal minute indications. Since there is a total of 12 hours, only 12 lights are required to indicate the hours; and, since the minutes are indicated by decimal means, there are required only six lights for the tens digit of the minute indications, and 10 lights for the units digit of the minute indications. This gives a total, in this embodiment, of only 28 lights.

Another important feature of the present invention is the means by which the clock is set to indicate the proper time. There is a plurality of pushbuttons on the clock, and these pushbuttons directly condition the circuitry to operate the indicator lights so that one can simply push the proper buttons and immediately obtain a proper time indication on the clock. If the clock is to be set at 12 o'clock, one can simply push one button to make the clock indicate 12 o'clock.

These and other features and advantages of the present invention will become evident from consideration of the following specification when taken in conjunction with the accompanying drawings in which:

DESCRIPTION OF THE PREFERRED EMBODIMENT

Figure 1:
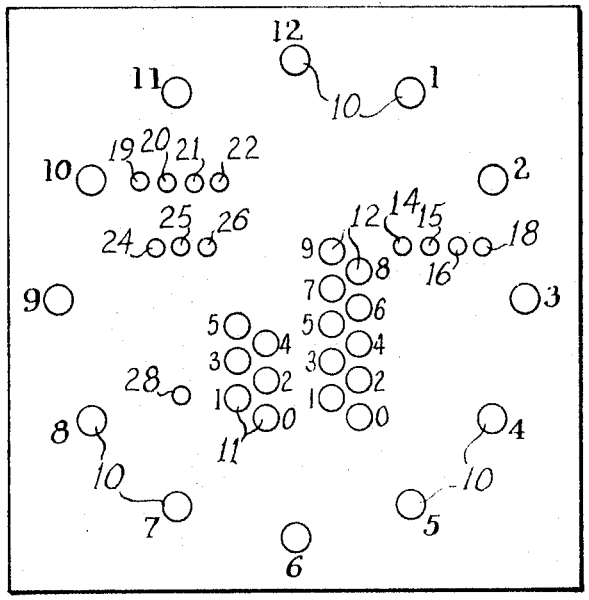
FIG. 1 is a front elevational view of one preferred embodiment of an electronic clock made in accordance with the present invention.

Referring now more particularly to the drawings and to that embodiment here chosen by way of illustration, it will be seen from FIG. 1 that the face of the clock as here presented includes 12 indicator lamps 10 arranged substantially in a circle. These indicator lamps 10 are arranged as the numbers on a conventional clock face so that the hour can be determined by the position of the lamp; however, it will be readily apparent that, optionally, the number indicating the hour can be placed on the lamp or on the clock face alongside these lamps. For clarity, the numbers of the hours are here shown on the clock face.

Within the circle formed by the indicator lamp 10, two staggered rows indicator lamps 11 and 12. The row of lamps 11 is to indicate the 10 digit of the minute, and are here shown as numbered from zero through five.

At this point, it will be understood that one of the indicator lamps 10 will be lighted to indicate the hour of the day, i.e., the lamp 10 numbered as 2 would indicate the second hour. Also, one of the indicator lamps 11 would be lighted to indicate the 10 digit of the minute, and one of the lamps 12 would be lighted to indicate the units digit. If the time be 2:32, the indicator lamp 10 that is numbered 2 would be lighted, the indicator lamp 11 that is numbered 3 would be lighted, and the indicator lamp 12 that is numbered 2 would be lighted, thus giving the hour as 2, the tens digit of the minute as 3, and the units digit of the minute as 2.

Conveniently located on the clock there are pushbuttons to set the proper hour on the clock. In the embodiment illustrated in FIG. 1, the buttons are shown on the face of the clock. There are four pushbuttons 14, 15, 16, and 18 to light the appropriate indicator lamp 10 to indicate the proper hour; there are four pushbuttons 19, 20, 21 and 22 to indicate the proper units digit of the minute; there are three buttons 24, 25, and 26 to indicate the proper tens digit of the minute; and, there is a reset button 28 that will always set the clock to indicate 12 o'clock. The operation of these buttons will be discussed hereinafter in connection with the control circuitry.

The general theory of operation of the present invention is to establish a basic time input, such as a sine wave, that has some commensurability with the relationship of hours, minutes, and seconds, This time source is then subdivided into an identical relationship as the relationship between hours, minutes, and seconds.

In the particular embodiment here presented by way of illustration, the basic time input is the standard 60 cycle alternating current that is used as conventional household electrical power supply, though it will be understood that the invention would be as readily applicable to the use of a tuned oscillator to establish the basic time input.

Figure 2:
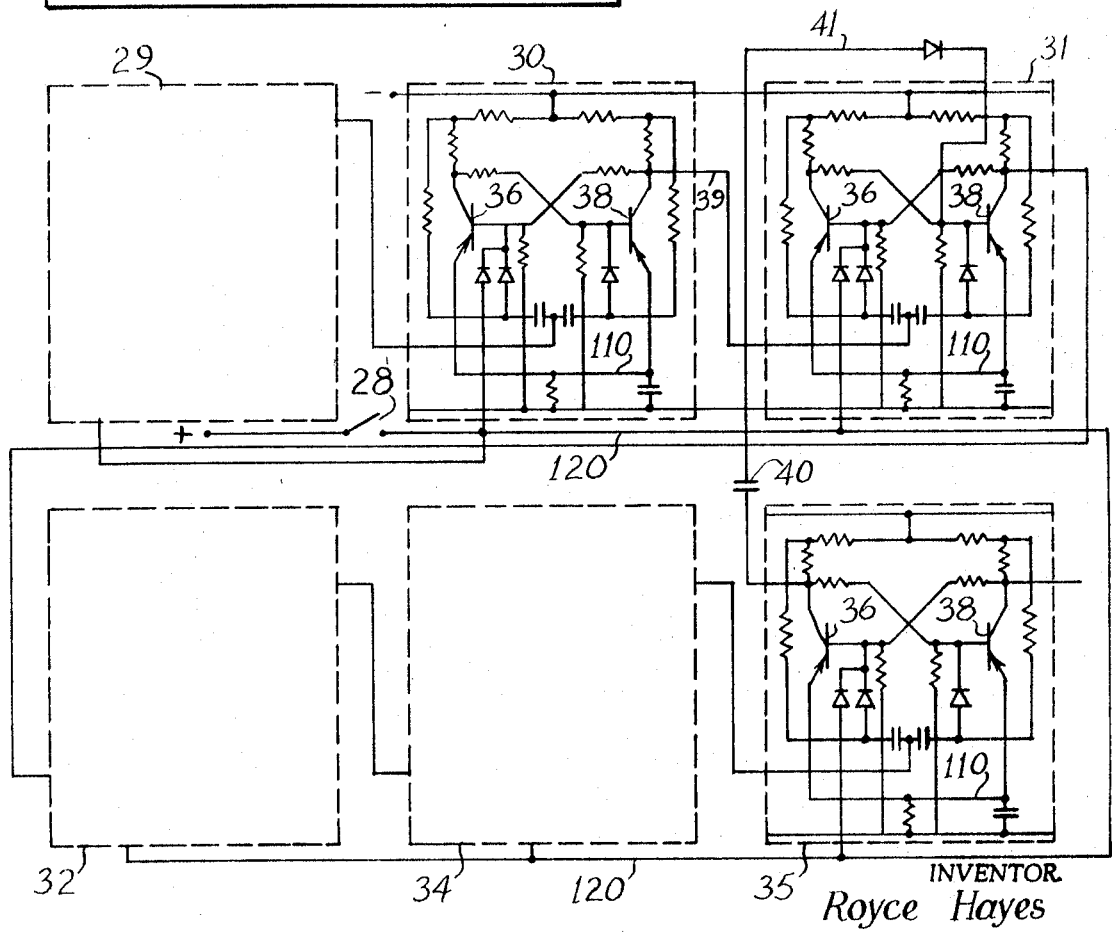
FIG. 2 is a schematic representation of a frequency divider and second counter, partially in block diagram and partially in detail electrical schematic.

Beginning with a 60 cycle per second current, one must derive a 1 cycle per second signal in order to represent seconds of time. Referring to FIG. 2 of the drawings it will be seen that a rather conventional frequency divider is used comprising, in this instance, six flip-flop circuits 29, 30, 31, 32, 34, and 35 arranged in tandem so that the first flip-flop 29 receives every pulse, the second flip-flop 30 will receive one pulse for every two pulses, the flip-flop 31 will receive one pulse for every four pulses, and so on. The object of this particular circuitry is to divide the 60 cycle current by 60 to provide a 1 cycle per second signal. In order to do this, the sixth flip-flop 35 has a feedback circuit so that when the flip-flop 35 is set, the flip-flop 31 will remain set.

In FIG. 2, three of the flip-flop circuits are shown simply as rectangles while three of the flip-flop circuits are shown in full schematic. All six of the flip-flops are identical in circuitry, so the connections shown between the flip-flop 30 and the flip-flop 31 are typical of the connection between all of the flip-flops except the feedback circuit shown between the flip-flop 35 and the flip-flop 31.

It will be seen that each of the flip-flops 29 through 35 includes a pair of transistors 36 and 38 as is conventional. When the base of one of the transistors 36 or 38 has a sufficiently high negative potential impressed thereon, the emitter-collector circuit will conduct to allow a current to flow. The collector of each of the transistors 36 and 38 is connected to the base of the opposite transistor so that only one of the transistors can be fired at any particular time. The collector of the transistor 38 is connected through a wire 39 to the nest successive flip-flop, in this example to the flip-flop 31; therefore, when the transistor 38 in the flip-flop 30 is fired, a pulse will be fed to the flip-flop 31. If the transistor 38 in the flip-flop 31 is in a state to pass a current in its emitter-collector circuit, the pulse will not be passed to the next flip-flop 32; however, if the transistor 36 is in a state to pass a current in its emitter-collector circuit, the pulse will be passed on to the nest flip-flop 32. Since each pulse that enters the flip-flop will change the condition of the flip-flop to the opposite condition, every alternate pulse will pass through the flip-flop, and every other pulse will not pass through the flip-flop. It will therefore be seen that each of the flip-flops 29 through 35 will divide the number of pulses entering the flip-flop by a factor of two.

Since it is desired that the last flip-flop 35 should produce a pulse for every 60 pulses that enter the flip-flop 29, and there are 60 pulses per second entering the flip-flop 29, the transistor 36 in the flip-flop 36 has its collector connected through a capacitor 40 to the base of the transistor 38 in the flip-flop 31. With this arrangement, the 30-second pulse that enters the frequency divider shown in FIG. 2 will pass through the diode in the feedback circuit from flip-flop 35 to flip-flop 31 so that the transistor 36 will conduct. Now, it will require four pulses for the flip-flop 31 to pass one pulse to the flip-flop 32; it will require eight pulses for the flip-flop 32 to pass one pulse to the flip-flop 34; and it will require 16 pulses for the flip-flop 34 to pass one pulse to the flip-flop 35. These 28 pulses added to the previous 32 pulses will equal the required 60 pulses in order to get one pulse completely through the frequency divider. It will therefore be seen that the frequency divider shown in FIG. 2 will receive a 60 cycle per second current and will emit a 1 cycle per second current.

The 1 cycle per second current that has now been obtained will be fed into a second-counter that will again divide the pulses by 60. The second-counter is completely identical to the frequency divider and is therefore not shown again. Both construction and operation are the same as that described for the frequency divider. It will therefore be seen that the output from the second-counter will be one pulse out for every 60 pulses that enter. Since one pulse per second enters the second-counter, one pulse for every 60 seconds will be emitted from the second-counter, or one pulse every minute.

Thus far, it will be seen that the 60 cycle per second current has been divided so that a signal can now be obtained each second of time, and a pulse is emitted for each minute of time. The pulses from the second-counter are then fed into a minute-counter. Since, as previously described, the indication for the minutes of time is divided into two different groups of indicator lamps, the minute-counter is also divided into two sections. The first section is for the units digit of the minute indication and is shown in FIG. 3 of the drawings.

Figure 3:
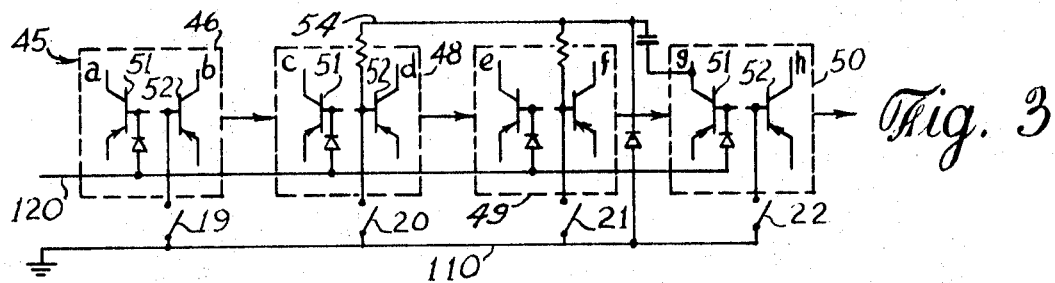
FIG. 3 is a diagram of the units digit portion of the minute counter.

Referring to FIG. 3, it will be seen that the units-digit-counter 45 comprises four flip-flops 46, 48, 49 and 50. Since these flip-flops have the same circuitry as the flip-flop described in FIG. 2, the circuit is not shown in detail, but the two transistors here indicated as 51 and 52 are shown.

The general operation of the counter is the same as that previously described, but the apparatus 45 must divide the one pulse per minute that enters the series of flip-flops by the factor of 10. It will be understood that the first pulse will go no farther than the flip-flop 46, but the flip-flop 46 will be set so that the transistor 51 will conduct. The second pulse then will pass from the collector of the transistor 52 in the flip-flop 46 to the flip-flop 48. The flip-flop 48 will not allow the pulse to pass through the flip-flop 48 and to the flip-flop 49, but it will set the flip-flop 48 so that the transistor 51 in the flip-flop 48 will conduct. This process will continue until the eighth pulse that enters the counter 45 will pass through the transistor 51 in the flip-flop 50; and, it will be seen that the collector of the transistor 51 in the flip-flop 50 is connected by a conductor 54 to the bases of the transistors 52 in each of the flip-flops 48 and 49. Therefore, the eighth pulse will set the flip-flops 48, 49, and 50. The ninth pulse will set the flip-flop 46, and the 10th pulse will now be able to pass through all four of the flip-flops 46—50 and emit one pulse from the counter 45. Since one pulse per minute enters the counter 45, and the counter 45 divides these pulses by a factor of 10, one pulse will be emitted from the counter 45 every 10 minutes.

Figure 4:
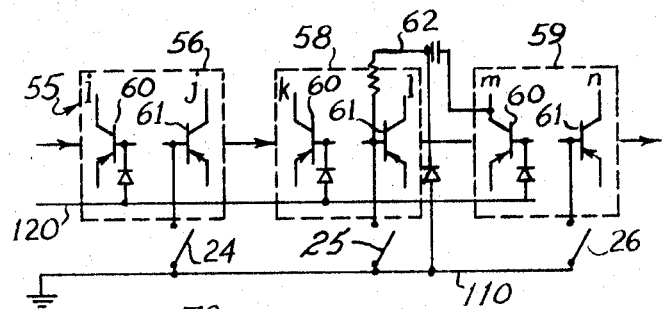
FIG. 4 is a schematic representation of the 10 digit portion of the minute counter used in the present invention.

The next step is to provide signals for the indicator lamps that indicate the tens digit of the minutes. To do this, a signal is required for each 10 minutes, so the total pulse count should be divided by six. A divide-by-six counter 55 is therefore used, and this counter is shown in FIG. 4 of the drawings. The counter 55 comprises three flip-flops 56, 58, and 59 that are again the same as the flip-flops described in connection with FIG. 2 of the drawings. The transistors 60 and 61 are shown within the rectangles indicating the flip-flops.

Figure 5:
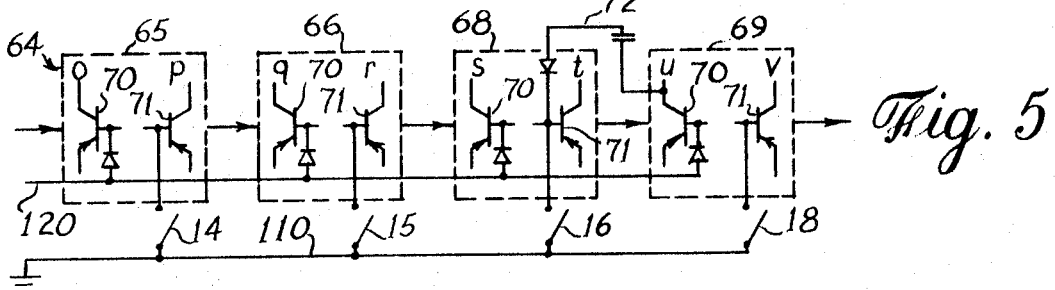
FIG. 5 is a schematic presentation of the hour counter used in the present invention; and, FIGS. 6A—6C are schematic representations of the indicator lamps and their associated control circuitry.

With the arrangement as shown in FIG. 4, it will be understood that the fourth pulse that enters the counter 55 will pass through the transistor 60 of the flip-flop 59, and through the conductor 62 will set the transistor 60 in the flip-flop 58. The fifth pulse entering the counter 55 will set the flip-flop 56, and the sixth pulse entering the counter 55 will then be able to pass through all of the flip-flops 56, 58, and 59 to emit a pulse. Since the pulses entering the counter 55 were at the rate of one pulse for every ten minutes, the pulses emitted from the counter 55 will be emitted at the rate of one pulse for every 60 minutes.

there must now be an indication of the hours so that the hours from 1 to 12 can be indicated by the indicator lamps on the clock. This is achieved by the divide-by-12 counter 64 that is shown in FIG. 5 of the drawings. The counter 64 includes four flip-flops 65, 66, 68 and 69. Each of the flip-flops 65 through 69 includes the two transistors 70 and 71.

With this arrangement, it will be seen that the eighth pulse that enters the counter 64 will set the flip-flop 68 by a pulse passing through the transistor 70 of the flip-flop 69, through the conductor 72, to the base of the transistor 71 and the flip-flop 68. The ninth pulse will set the flip-flop 65, the tenth pulse will set the flip-flop 66 and reset the flip-flop 65, the eleventh pulse will set the flip-flop 65, and the 12 pulse can then pass through all of the flip-flops 65 through 69 to emit one pulse every 12 hours.

While emphasis has thus far been placed on the frequency of pulses from the various counters shown in FIGS. 2 through 5 of the drawings, those skilled in the art will realize that, by attaching a conductor to the collector of each of the transistors 36, 51, 60 and 70, and 38, 52, 61 and 71, a signal can be obtained less frequently than the output signal from the entire counter. By attaching conductors to the collectors of the transistors 70 and a signal can be obtained once each hour in order to control the indicator lamps 10 that indicate the hours of time; conductors attached to the collectors of the transistors 60 and 61 will provide a signal once each 10 minutes to provide a signal to control the lamps 11 in order to indicate the tens digit of the minute; and, conductors attached to the collectors of the transistors 51 and 52 will provide a signal once each minute to provide a signal to control the indicator lamps 12 to indicate the units digit of the minutes.

The various signals from the transistors of the flip-flops are fed into an or gate, and the arrangement is such that, when the proper condition is set, the appropriate indicator lamp will turn on.

Figure 6A:
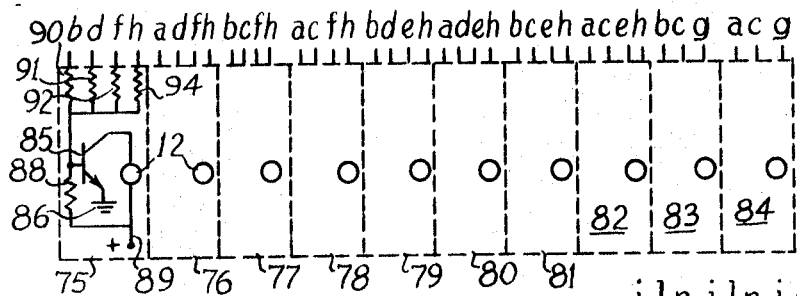

Referring now to FIG. 6A of the drawings, it will be seen that there is a group of 10 or gates 75 through 84. Associated with each or gate is a lamp driver and one of the indicator lamps 12. All of the or gates 75 through 84 and the lamp drivers are identical, so only one of each is shown in detail.

The lamp driver 75' in FIG. 6A includes a transistor 85 having its collector connected to a lamp 12 and its emitter connected to ground 86. The base of the transistor 85 is connected through a resistor 88 to the wire 89, and the wire 89 is connected to a source of positive potential. The base of the transistor 85 is also connected to the or gate 75 comprising four resistors arranged in parallel 90, 91, 92, and 94.

It will now be seen that the positive potential through the resistor 88 is a high potential that is sufficient to trigger the transistor 85. When a negative potential is placed across the resistors 90, 91, 92, and 94, the base of the transistor 85 will be at a sufficiently high-negative potential to prevent a current flow from the positive potential, through the lamp 12, through the transistor 85 and to the ground 86, It will, therefore, be seen that one must simply place a positive potential on the leads of each or gate to cause its associated light to be lighted.

Figure 6B:
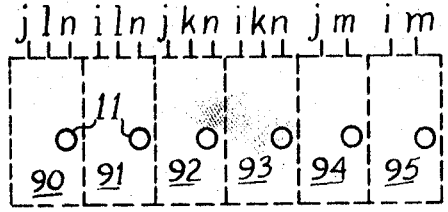

FIG. 6B is similar to FIG. 6A but shows the or gates for controlling the tens digit of the minute indicator. Again, the circuit arrangement is exactly like the circuit of or gate 75 and lamp driver 75' so the or gates and lamp drivers are shown simply by rectangles 90 through 95.

Figure 6C:
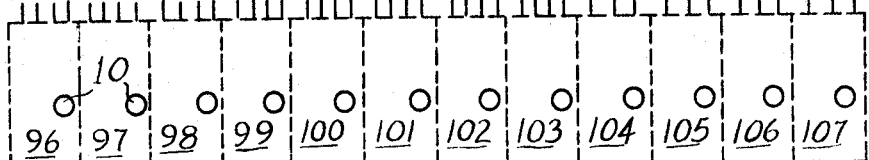

FIG. 6C of the drawings shows a similar arrangement of or gates and lamp drivers 96 through 107. There are 12 of these with 12 associated lamps 10 to indicate the hours of time.

Those skilled in the art will realize from FIG. 2 that when a current flows through the emitter-collector circuit of one of the transistor 36 or 38, the potential of the collector will be positive. Since all of the flip-flop circuits are alike, the potential on any of the transistors in the flip-flops will be positive when a current is flowing through the emitter-collector circuit. This therefore has eliminated the negative voltages of the or gate and will allow the positive voltage source to cause a lamp driver to conduct.

To indicate the manner of connection to be used in the one particular embodiment of the invention here chosen by way of illustration, the collector on each of the transistors has a letter of the alphabet, and the terminals of each of the or gates have corresponding letters of the alphabet. All of these connections will not be described in detail to prevent needless repetition, but a few remarks might be appropriate.

The procedure to connect the collectors of the various transistors within the flip-flop to the various terminals on the or gate is to connect the collector of those transistors that are in a state to conduct to the terminals of the or gate that require a positive potential at that particular time. For example, if the hour 1 is to be indicated, this would be a "one" count in the hour counter 64. Since the first pulse that enters the hour counter 64 finds all of the transistors 71 in a state to conduct, but will of course set the flip-flop 65, the transistor 70 in the flip-flop 65 will be conducting, the transistor 71 in the flip-flop 66 will be conducting, the transistor 71 in the flip-flop 68 will be conducting, and the transistor 71 in the flip-flop 69 will be conducting. This therefore leads one to connect the collectors to the four terminals on the or gate 97 which indicated the first hour. A similar examination of each of the counters would allow one skilled in the art to make all necessary connections to the various or gates.

In the three counters 45, 55, and 64 shown respectively in FIGS. 3, 4 and 5, there are manually operated switches to set all of the flip-flops, and these switches correspond to the pushbuttons of the face of the clock shown in FIG. 1 as previously described.

Referring first to FIG. 3 of the drawings, the four switches 19, 20, 21 and 22 are connected between the base of the transistor 52 and the ground on the conductor 110. It will thus be seen that, if the switch 19 be closed, the potential from the line 110 will override any internal control circuitry to cause the transistor 52 in the flip-flop 46 to be in a state to not conduct. By pushing any one, or any group, of the switches 19 through 22, any one or plurality of the flip-flops 46, 48, 49, or 50 can be set to indicate any desired count, hence to light any desired one of the indicator lamps 12.

In FIG. 4 of the drawings, the switches 24, 25, and 26 correspond to the pushbuttons on the face of the clock having the same numerals and allow any of the flip-flops 56, 58 or 59 to be set to light any one of the indicator lamps 11.

In FIG. 5 of the drawings, there are likewise switches 14, 15, 16 and 18 that correspond to the pushbuttons on the face of the clock having the same numerals. These switches 14 through 18 are connected between the ground 110 and the bases of the transistors 71.

In the present embodiment of the invention, the arrangement is such that when all of the flip-flops 46, 48, 49, and 50 are set so that the transistors 52 are in a state to conduct, the numerals indicated by the lights 12 is zero; when the flip-flops 56, 58, and 59 are set so that the transistors 61 are in a state to conduct, a zero is indicated on the lamps 11; and, when the flip-flops 65, 66, 68, and 69 are set so that the transistors 71 are in a state to conduct, the hour indicated by a lamp 10 is 12. Because this particular arrangement was chosen, one can at any time set all of the flip-flops in all of the counters 45, 55, and 64 and the hour 12 o'clock will be indicated by the clock. This is done by depressing the reset button 28 on the face of the clock that would simply direct the positive potential of the line 120 to the bases of all the transistors 51, all the transistors 60, and all the transistors 70. The switch 28 corresponding to the button 28 is shown in FIG. 2 of the drawing. It will be seen from the drawings that, when a positive potential is placed on line 120, all the flip-flops will be set to cause the clock to indicate 12 o'clock.

It will now be seen that the present invention provides an electronic clock that has a minimum of circuitry and includes no mechanically moving parts with the exception of the very simple pushbutton switches. The clock will always remain as accurate as the standard time input such as the frequency of household current, if this be used, or the frequency of an oscillator if that be used. If the clock happens to indicate the wrong time due to cessation of power or the like, the clock is very simple to set to the proper time by pushing appropriate ones of the pushbuttons located on the face of the clock. If the hour be correct and only the minutes are incorrect, only the pushbuttons 19 through 26 must be depressed; or, if only the hour be wrong, only the buttons 14 through 18 must be depressed. Any time it is desired to have the clock shown the hour of 12, only the one button 28 must be depressed.

It will of course be understood that the particular embodiment of the invention here shown and described is by way of illustration only, and is meant to be in no way restrictive; therefore, numerous changes and modifications may be made, and the full use of equivalents resorted to without departing from the spirit or scope of the invention as defined by the appended claims.

I claim:

1. An electronic clock including means for providing a basic time first dividing means for dividing said basic time input by a factor to provide 1-minute indications to give the units digit of the minute of the day, second dividing means for dividing by a factor to provide 10-minute indications to give the tens digit of the minute of the day, and third dividing means for dividing by a factor to provide 1-hour indications to give the hours of the day, each of said first dividing means, said second dividing means and said third dividing means including a series of flip-flops having a first state and a second state, manual switch means to selectively change each of said flip-flops from the said second state to the said first state a first plurality of lamps comprising one lamp for each hour to be indicated, a second plurality of lamps comprising one lamp for each tens of minutes to be indicated, a third plurality of lamps comprising one lamp for each unit of minutes to be indicated, a plurality of or gates, each of the said plurality of or gates having a lamp driver electrically connected thereto, and a plurality of inputs wherein each of said plurality of inputs is electrically connected on one of the said flip-flops to trigger the said lamp driver when the flip-flop is in a given state and each of said lamps is connected to one of said lamp drivers.

2. An electronic clock according to claim 1 and including switch means to place all of the said flip-flops simultaneously in the said second state.

3. An electronic clock according to claim 1 in which said first plurality of lamps is arranged substantially in a circle as the hour indications of a clock face.

4. An electronic clock according to claim 3 in which said second plurality of lamps is arranged in a staggered row within the first plurality of lamps, and the said third plurality of lamps is arranged in a staggered row substantially parallel to the said second plurality of lamps.

5. An electronic clock according to claim 2 in which the time of day indicated is 12 o'clock when said all of the said flip-flops are in the said second state.